(12) United States Patent
Itoh et al.

(10) Patent No.: US 8,964,030 B2
(45) Date of Patent: Feb. 24, 2015

(54) SURVEILLANCE CAMERA SYSTEM HAVING CAMERA MALFUNCTION DETECTION FUNCTION TO DETECT TYPES OF FAILURE VIA BLOCK AND ENTIRE IMAGE PROCESSING

(75) Inventors: Masaya Itoh, Hitachinaka (JP); Yuan Li, Hitachi (JP); Takashi Saeki, Hitachinaka (JP); Yasuhiro Suda, Hitachi (JP)

(73) Assignee: Hitachi, Ltd., Tokyo (JP)

(*) Notice: Subject to any disclaimer, the term of this patent is extended or adjusted under 35 U.S.C. 154(b) by 685 days.

(21) Appl. No.: 13/186,533

(22) Filed: Jul. 20, 2011

(65) Prior Publication Data
US 2012/0026326 A1    Feb. 2, 2012

(30) Foreign Application Priority Data
Jul. 30, 2010   (JP) .................... 2010-171306

(51) Int. Cl.
*H04N 9/47*  (2006.01)
*G06K 9/40*  (2006.01)
*G06K 9/00*  (2006.01)
*H04N 7/18*  (2006.01)

(52) U.S. Cl.
CPC .......... *G06K 9/40* (2013.01); *G06K 9/00771* (2013.01); *H04N 7/181* (2013.01)
USPC ....................................... 348/143

(58) Field of Classification Search
USPC ....................................... 348/143
See application file for complete search history.

(56) References Cited

U.S. PATENT DOCUMENTS

2007/0126869 A1*  6/2007  Montminy et al. .......... 348/143
2008/0317356 A1   12/2008  Itoh et al.
2010/0208812 A1*  8/2010  Murakami et al. ........ 375/240.12

FOREIGN PATENT DOCUMENTS

| JP | 2001-006056 | 1/2001 |
| JP | 2002-304677 | 10/2002 |
| JP | 2008-077517 | 4/2008 |
| JP | 2009-005198 | 1/2009 |
| JP | 2009-193464 | 8/2009 |
| JP | 2010-200190 | 9/2010 |

OTHER PUBLICATIONS

Chinese Office Action for Chinese Application No. 201110205292.9, issued on Oct. 28, 2013.

* cited by examiner

*Primary Examiner* — Dave Czekaj
*Assistant Examiner* — Leron Beck
(74) *Attorney, Agent, or Firm* — Antonelli, Terry, Stout & Kraus, LLP.

(57) ABSTRACT

A camera surveillance system having a camera malfunction function includes an entire feature extraction unit to extract each entire feature from an input image and a reference image; a block feature extraction unit to extract block features being features of each block from images after the block division of the input image and the reference image divided into blocks by a block division unit; and a malfunction determination unit to calculate a first variation between the entire features of the reference image and the entire features of the input image, and a second variation between the block features of the reference image and the block features of the input image, to determine a camera malfunction by using a threshold, and output information indicating a type of the camera malfunction for each block.

9 Claims, 12 Drawing Sheets (a)      (b)

FIG.13

| MALFUNCTION TYPE | | FEATURES | PRIORITY | MAINTENANCE WORK | FACTOR |
|---|---|---|---|---|---|
| PARTIAL OCCLUSION | BLOCK | LUMINANCE AVERAGE, EDGE STRENGTH DISPERSION | 1 | SHIELDING REMOVAL | SHIELDING |
| ENTIRE OCCLUSION | ENTIRE | LUMINANCE AVERAGE, EDGE STRENGTH DISPERSION | 1 | SHIELDING REMOVAL | SHIELDING |
| CAMERA ANGLE SHIFT | ENTIRE | INCREMENT SIGN CODE CORRELATION | 3 | CAMERA ADJUSTMENT | INSTALLATION COMPONENT |
| DEFOCUS | BLOCK | EDGE STRENGTH, EDGE ANGLE, LUMINANCE AVERAGE | 2 | LENS ADJUSTMENT | LENS ADJUSTMENT |
| NOISE | ENTIRE | SUMMATION OF ABSOLUTE DIFFERENCES, LUMINANCE AVERAGE | 4 | ELECTRIC COMPONENT CONFIRMATION | BREAKING OF CABLE WIRES |
| OVEREXPOSURE | BLOCK | LUMINANCE AVERAGE, MAXIMUM NUMBER OF LUMINANCE | 4 | CAMERA ADJUSTMENT | LIGHT MIXTURE/CCD |
| TRANSPARENT OBJECT | BLOCK | RGB CORRELATION, EDGE STRENGTH | 4 | LENS ADJUSTMENT | LENS CONTAMINATION |
| ... | ... | ... | ... | ... | ... |

SURVEILLANCE CAMERA SYSTEM HAVING CAMERA MALFUNCTION DETECTION FUNCTION TO DETECT TYPES OF FAILURE VIA BLOCK AND ENTIRE IMAGE PROCESSING

BACKGROUND OF THE INVENTION

The present invention relates to a video surveillance system having a camera malfunction detection function of detecting a video acquisition failure due to an obstruction to a camera or equipment fault in a video surveillance system (surveillance camera system) which acquires videos from an imaging device such as a camera and has a function of intruder detection by image recognition.

The video surveillance system has a function of detecting a moving object such as a person and vehicle which appear in a surveillance area based on image recognition from a video acquired from a camera. By using detection results, the video surveillance system draw a warder to attention by using a function of storing only videos in which moving objects appear, a display of a warning icon on a display device, or ringing of a buzzer. Therefore, the video surveillance system serves to reduce a load of a watching service in which a continuous confirmation work is necessary. In addition, in the above-described video surveillance system, when dishonesty such as theft is caused, the stored video can serve to attest to the crime afterward.

With respect to the above-described video surveillance system, problems by conducts occur such that a criminal changes an imaging angle of the camera, places shielding in front of the camera, or causes harm to a camera lens so that evidential videos may not be acquired. Since video signals themselves can be acquired in the case of these conducts, useful videos cannot be acquired unless visual checking is performed.

Further, when a failure of the imaging device itself is caused, videos can not be acquired naturally so that the video surveillance system may be deactivated. A malfunction of the device needs to be acknowledged to the warder, the malfunction of the camera need to be repaired, and the video surveillance system needs to be restored.

To cope with the above-described problem, a method for detecting a change in an image by image recognition, and detecting a malfunction of a camera is disclosed, for example, in JP-A-2001-6056, JP-A-2008-77517, and JP-A-2009-193464. In JP-A-2001-6056, disclosed is a technology in which an infrared LED is provided as an auxiliary illumination, a photo sensor detecting the brightness of monitoring environment is provided, and a unit which detects obstruction to a camera through the above-described detectors is provided. In JP-A-2008-077517, the following technology is disclosed: An input image is compared with a reference image to calculate a change in each pixel. From this result, by using a subtraction or dispersion of luminance, it is checked whether it is a single color blocking action to cover a camera and make the image only one black or white, or a mixed change blocking action to change a direction of the camera and change the entire image. In JP-A-2009-193464, disclosed is a technology in which image data is divided into multiple blocks, a standard deviation value and a variation of luminance value are calculated in each block to detect whether the camera is covered.

SUMMARY OF THE INVENTION

An object of the invention is provide a surveillance camera system having a camera malfunction detection function which can immediately gives a notice of warning and enables a procedure such as maintenance and check according to its conditions when detecting an obstruction to a camera. Its procedure needs to be changed depending on the type of the camera malfunction, like replacement of a lens in the case where the lens is broken, and readjustment of a camera in the case where an angle of the camera is changed. Therefore, it is important to detect not only the malfunction but also the type of the camera malfunction with regard to the camera malfunction detection.

The conventional method disclosed in JP-A-2001-6056, JP-A-2008-77517, and JP-A-2009-193464 is the method for detecting the obstruction to the camera by using information from the infrared sensor, or the detection method based on the change in the luminance value. Therefore, in the conventional methods, only the occlusion of the lens can be mainly detected among the camera malfunctions.

However, as the type of the camera malfunction, the surveillance camera system having the camera malfunction detection function has to cope with various types of camera malfunction such as partial occlusion, entire occlusion, camera angle shift (deviation in the camera direction), defocus, noise, and halation (overexposure).

Further, there arises a problem that in the above-described conventional method, a normal video such as movement of a person is easy to be misreported. Since a change in the luminance can be caused also by the movement of the person, there is a high possibility that the above is detected as the camera malfunction in a place where a lot of people frequently go in and out.

It is an object of the present invention to improve the above-described problems, and by reporting a malfunction detection of the surveillance camera and its type to provide a surveillance camera system which realizes a malfunction return or improving the efficiency of services such as maintenance and check.

Other problems except the above-described problem will be apparent from the description of this specification and accompanying drawings.

The present invention adopts, for example, the following configuration in order to solve the aforementioned problems.

(1) A surveillance camera system having a camera malfunction detection function of detecting a camera malfunction from an input image and a reference image, includes a reference image update unit to generate or select the reference image to be compared; a block division unit to divide into blocks each of the input image and the reference image; an entire feature extraction unit to extract each entire feature from the input image and the reference image; a block feature extraction unit to extract block features being features of each block from images after the block division of the input image and reference image divided into blocks by the block division unit; a malfunction determination unit to calculate a first variation between the entire features of the reference image and the entire features of the input image, and a second variation between the block features of the reference image and the block features of the input image, to determine the camera malfunction using a threshold, and output information indicating a type of the camera malfunction for each block; a camera malfunction classification unit to refer to a predetermined malfunction classification criterion of the camera malfunction to classify the camera malfunction based on the information indicating the type of the camera malfunction for each of the blocks; and an output unit to output a camera malfunction classified by the camera malfunction classification unit.

(2) According to the present invention, at least one or more features of image features and statistical features is used as the features, and at least one or more of a subtraction value and a correlation value is used as the variation; and the malfunction determination unit outputs an area determined to be the camera malfunction by the threshold determination as a malfunction candidate area of the camera malfunction.

(3) Furthermore according to the present invention, the surveillance camera system further includes a moving area detection unit to detect a moving area with motion from the reference image within the input image based on the input image and the reference image, wherein the malfunction determination unit calculates the malfunction candidate area as a malfunction area when the malfunction candidate area is not the moving area and a malfunction continuation time continues for a predetermined time or more, and determines to be the camera malfunction when an area of the malfunction area is larger than or equal to a threshold.

(4) Still furthermore according to the present invention, the malfunction classification criterion has information on whether any one of the block features or the entire features is used for each type of the camera malfunction, the features used for determining the camera malfunction, and a priority for determining the camera malfunction.

(5) Still furthermore according to the present invention, the malfunction determination unit detects the camera malfunction defined by the malfunction classification criterion in units of blocks divided by the block division unit; and the camera malfunction classification unit classifies the camera malfunction based on the priority when a plurality of the camera malfunctions are detected.

(6) Still furthermore according to the present invention, the malfunction classification criterion has information on a maintenance work for returning from the camera malfunction or a factor of the camera malfunction for each type of the camera malfunction.

(7) Still furthermore according to the present invention, the output unit refers to the malfunction classification criterion and outputs the maintenance work or the factor corresponding to the camera malfunction in addition to the camera malfunction.

(8) Still furthermore according to the present invention, the output unit stores the camera malfunction and the input image in a storage medium.

The above-described configuration is consistently one example, and the present invention can be appropriately modified in various ways without departing from a technical idea. Further, examples of other configurations except the above-described configuration of the present invention will be apparent from the description of this specification and accompanying drawings.

According to the present invention, when using the features and moving area of the entire input image and reference image and those of blocks divided into multiple pieces, the camera surveillance system can detect and classify various camera malfunctions such as partial occlusion, entire occlusion, camera angle shift (deviation in the camera direction), defocus, noise, and halation. Further, the efficient camera surveillance system which supports job efficiency of return from a malfunction, maintenance, and check can be provided.

Other advantages of the present invention will be apparent from the description of this specification.

BRIEF DESCRIPTION OF THE DRAWINGS

FIG. 13 illustrates one example of a malfunction classification reference of the present invention;

DETAILED DESCRIPTION OF THE EMBODIMENTS

Figure 1:
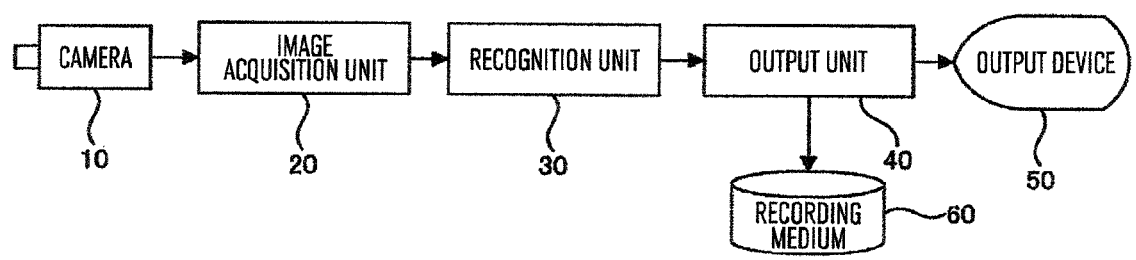
FIG. 1 illustrates the entire configuration according to one embodiment of the present invention.

Hereinafter, preferred embodiments of the present invention will be described with reference to the accompanying drawings of the embodiments. In each drawing, the same reference numerals as those of the first embodiment are given to the same or similar components as in the first embodiment, and the description will be omitted.

FIG. 1 illustrates the entire configuration of one embodiment of the present invention. FIG. 1 illustrates a configuration in the case where the present invention is applied to a surveillance camera system (video surveillance system) configured by a camera, a recording medium, and an output device. The surveillance camera system has an electric computer system including a CPU, memories, and LSIs as hardware, and is designed so as to perform each function. Here, the surveillance camera system is not expressed in constitutional unit of hardware, and each function configured by the hardware and software is expressed by blocks.

The surveillance camera system illustrated in FIG. 1 includes a camera 10, an image acquisition unit 20, a recognition unit 30, an output unit 40, an output device 50, and a recording medium 60. Recognition result information acquired by the recognition unit 30 is added to a video signal acquired from the camera 10, and it is stored in the recording medium 60.

The camera 10 supplies to the image acquisition unit 20 a video signal acquired by an imaging device configured by a camera lens and an image pickup medium such as a CMOS or a CCD. Here, the video signal can be acquired as image data of one-dimensional array or a two-dimensional array. For reducing an influence of noise or flicker, the image data may be subjected as pre-processing to a process using a smoothing filter, a contour intensifying filter, or concentration conversion. Further, a data format for a RGB color or monochrome may be selected as usage. Further, for reducing processing cost, the image data may be subjected to reduction processing to a predetermined size.

The output unit 40 supplies a result recognized by the recognition unit 30 and a video signal acquired by the camera 10 to the output device 50 and the recording medium 60. The output device 50 is a device that outputs an alarm based on the result produced from the recognition unit 30, for example, when a camera malfunction is recognized. Here, an output device such as an alarm unit, a speaker, a lamp, and a monitor can be selected.

As the recording medium 60, a tape and an electronic recording medium such as a hard disk drive and a flash memory can be used. Further, the output unit 40 can include an RGB monitor output and a data output via a network, and parameter setting is performed by using the user interface. For input in the user interface, an interface function of an input device such as a mouse and a keyboard is used. For output in the user interface, a monitor being one of the output devices 50 can be used.

Description will be made in detail below focusing on the recognition unit 30 being an important part of the present invention.

Figure 2:
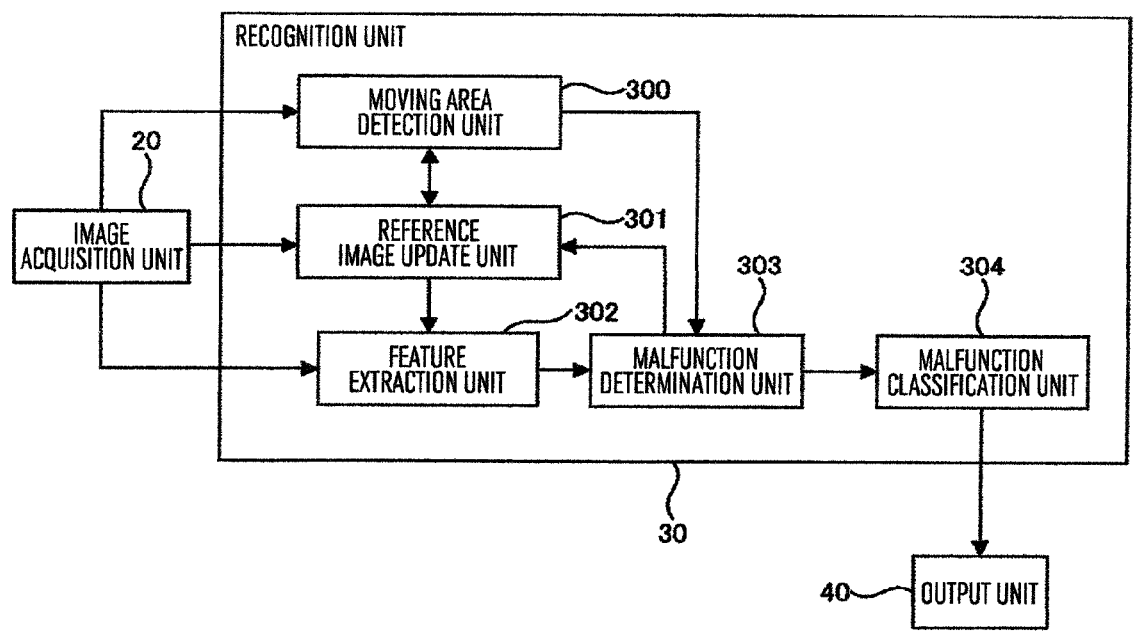
FIG. 2 illustrates a recognition unit of the present invention.

The recognition unit 30 will be described with reference to FIG. 2. The recognition unit 30 is configured by a moving area detection unit 300, a reference image update unit 301, a feature extraction unit 302, a malfunction determination unit 303, and a malfunction classification unit 304. The recognition unit 30 has a function of classifying the malfunction of the surveillance camera by the malfunction classification unit 304 and supplying it to the output unit 20. Details of each unit in the recognition unit 30 will be described in sequence below.

Figure 3:
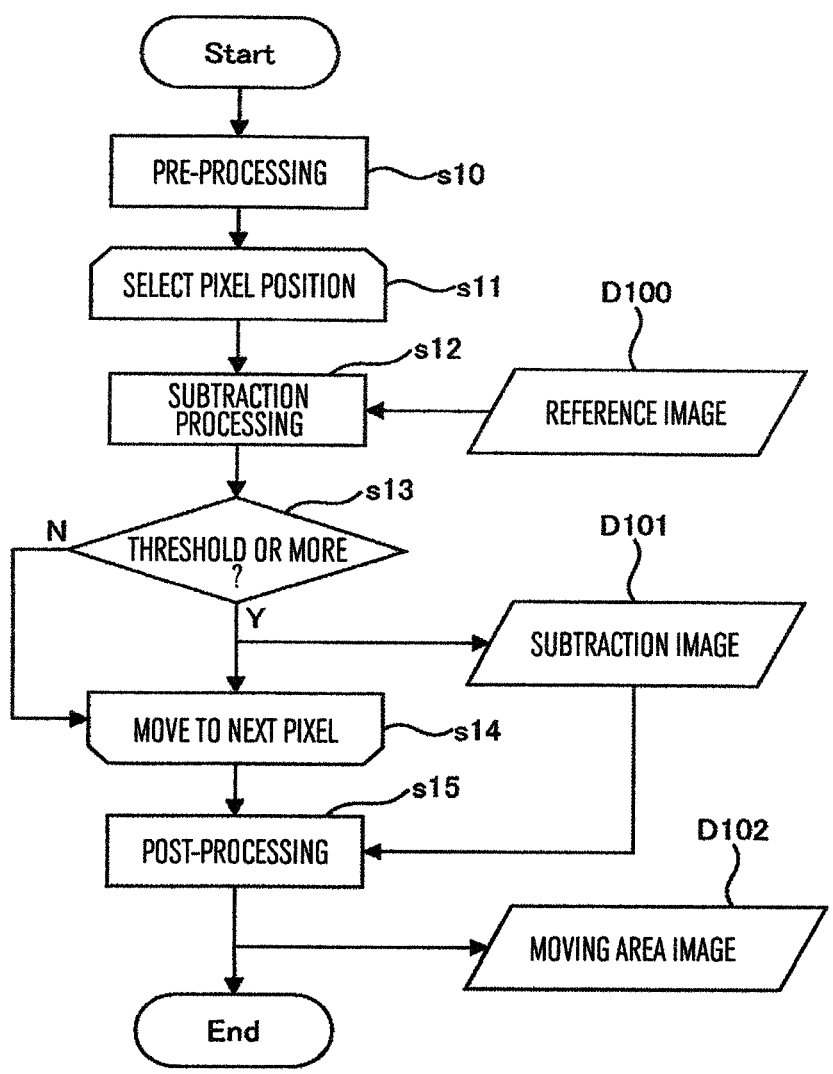
FIG. 3 is a flowchart illustrating a process procedure of a moving area detection unit of the present invention.

The moving area detection unit 300 prepares a moving area image based on the comparison between an input image acquired by the image acquisition unit 20 and a reference image previously prepared by the reference image update unit 301. A process procedure of the moving area detection unit 300 will be described with reference to FIG. 3. The moving area detection unit 300 performs an arithmetical operation for each pixel or for each arbitrary block, the input image being an input. First, the unit 300 performs pre-processing in a step s10. The above-described process is a process for improving a moving area detection performance. For example, the unit 300 may perform smoothing filtering for eliminating noises, edge extraction filtering for improving robustness, and image reduction processing to an arbitrary size for speeding up the processes. Further, the unit 300 previously initializes all pixels of the reference image D100 by zero.

The moving area detection unit 300 selects a pixel position within the input image (a step s11), and performs a process for extracting the moving area. The unit 300 moves on to the next pixel (a step s14), and repeats the above-described process over the entire image. For ease of explanation, a calculation at an arbitrary pixel will be described below.

At an arbitrary pixel position p(x,y), the moving area detection unit 300 extracts a subtraction between the input image and the previously-acquired reference image D100 (a step s12). Suppose, for example, that when subtraction processing using luminance values is performed, luminance values of the input image and the reference image D100 are set to I(p) and B(p), respectively. In that case, $D(p)=|I(p)-B(p)|$ holds with regard to its subtraction D(p). As long as the subtraction is as obtained as image information such as an edge and color information, the subtraction processing can be performed using any information according to the execution environment.

Next, the moving area detection unit 300 performs threshold processing in the subtraction D(p) obtained by the subtraction processing at the step s12 (a step s13). If the D(p) is larger than or equal to the threshold, the unit 300 adopts its value in a position corresponding to a subtraction image D101 (Y in the step s13), and moves on to the next pixel (a step s14). If the D(p) is smaller than the threshold, it is assumed that the change in the image is small and the change in the luminance is caused by noises. D(p)=0 is still maintained (N in the step s13), and the unit 300 moves on to the next pixel (the s14). When an image is configured based on the above-described results, the unit 300 obtains the subtraction image D101. Further, with respect to the subtraction image D101, the unit 300 performs post-processing and generates the moving area image D102 (a step s15).

In the post-processing in the step s15, according to the present embodiment, the moving area detection unit 300 performs binarized image processing. Further, the unit 300 forms the moving area by performing erosioning dilationing processing or labeling processing capable of integrating a binarized image area and filtering based on area. At this moment, the moving area image D102 becomes a binarized image that is configured by a value of 255 in the moving area and by a value of 0 in the area with no motion. In the post-processing step s15, the unit 300 may perform, for example, Gauss filtering or noise removal processing.

Figure 4:
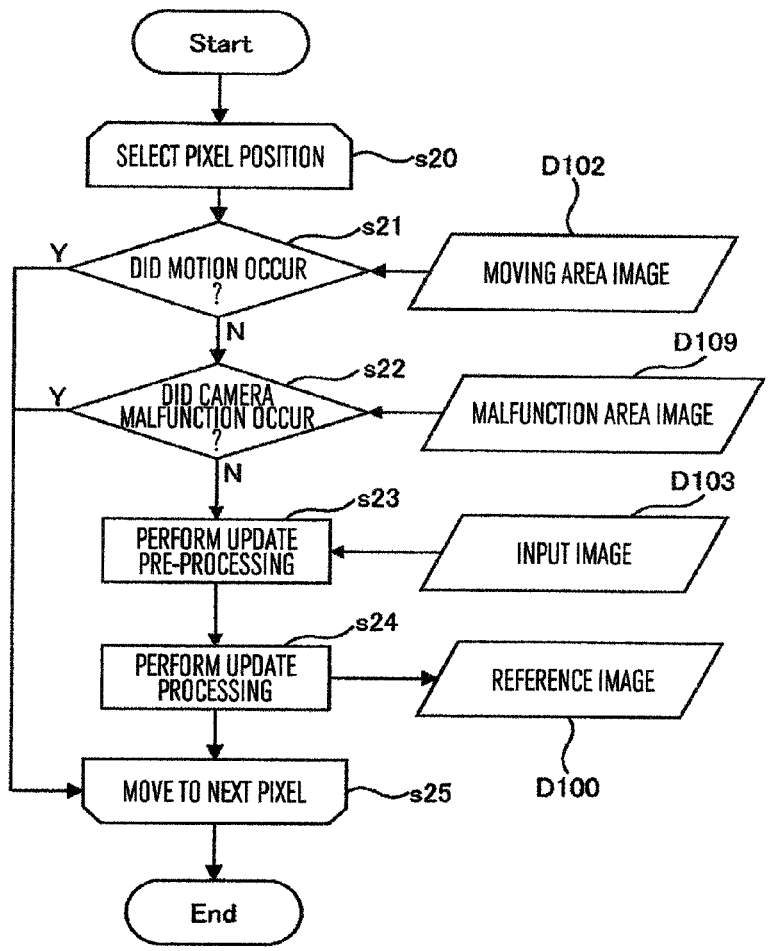
FIG. 4 is a flowchart illustrating a process procedure of a reference image update unit of the present invention.

The reference image update unit 301 will be described with reference to FIG. 4. The reference image is an image to be a reference and corresponds to a background image. The unit 301 selects a pixel position within an image (a step s20), and updates the reference image in each pixel. Further, the unit 301 proceeds to the next pixel, and repeats the above-described steps over the entire image (a step s25). When motion or camera malfunction does not occur within the image, the unit 301 updates the reference image. The reason is that when the reference image is updated in the case where the motion or camera malfunction occurs, videos to which motion of a person and an object or camera malfunction is mixed may be taken into the reference image, and as a result, performance deterioration may be brought. For ease of explanation, an arithmetic operation at an arbitrary pixel will be described below.

At an arbitrary pixel position p(x, y), the reference image update unit 301 refers to the moving area image D102 acquired by the moving area detection unit 300, and determines whether motion occurs in the pixel position p (a step s21). In the present embodiment, the moving area image D102 has a value of 0 or 255, and the process s21 is a process in which whether the value in the pixel position p of the moving area image D102 is 255 or not is determined. If the motion occurs (Y in the step s21), the unit 301 does not update the reference image D100, and moves on to the next pixel position (the step s25).

Then, if motion does not occur (N in the step s21), the reference image update unit 301 determines by using the malfunction area image D109 whether a camera malfunction occurs (a step s22). Generation of the malfunction area image D109 will be described later. Here, if determining that the camera malfunction occurs (Y in the step s22), the unit 301 does not update the reference image 100, and moves on to the next pixel position in the same manner as in the step s21 (the step s25).

When the camera malfunction does not occur (N in the step s22), in the image position in which the reference image update unit 301 determined in the above-described step that the motion does not occur in the moving area and also the camera malfunction does not occur, the unit 301 acquires the input image D103 from the image acquisition unit 20 and performs a update pre-processing of the reference image in the update pre-processing in a step s23. Even if no problems are in the above-described results of the moving area image D102 and the malfunction area image D109, disturbance such as noises may be mixed in the input image. In the update pre-processing s23, the noises of the input image are eliminated. In the present embodiment, by generating an image in which the input image D103 is averaged as much as arbitrary frames in each pixel position, noises generated in a short period of time are eliminated. For example, statistical processing, filtering processing using a smoothing filter, and image quality correction may be here performed in each pixel.

Next, in an update processing in a step s24, the reference image update unit 301 updates the reference image D100 in the currently-selected pixel position by using data in which the update pre-processing in the step s23 is performed. Namely, the reference image D100 here is an image in which the camera malfunction or motion of a person and an object is not mixed. The unit 301 repeatedly performs the above-described processes over the entire image.

Even if an automatically-updated unit is not used as in the reference image update unit 301, the reference image D100 can be arbitrarily set by a user. As a result, in the specified time, for example, when the input image and the set reference image are compared with each other, the camera malfunction can be detected.

Figure 5:
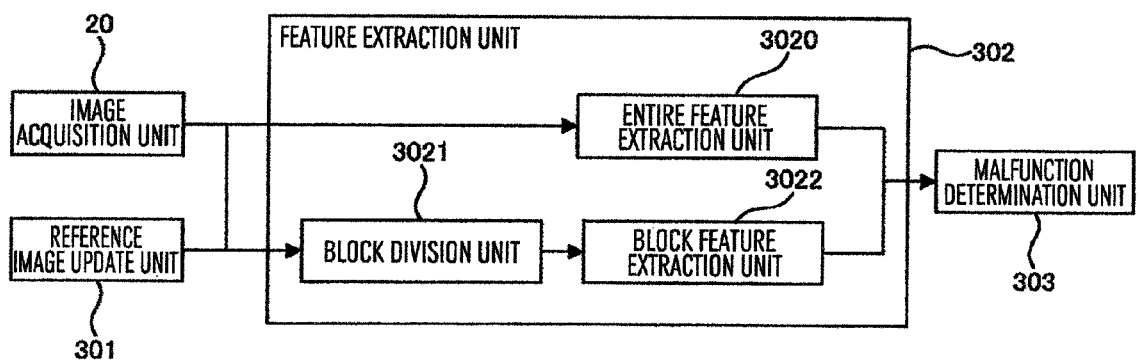
FIG. 5 illustrates a feature extraction unit of the present invention.

Next, the feature extraction unit 302 illustrated in FIG. 2 will be described with reference to FIG. 5. To the feature extraction unit 302, an input image acquired from the image acquisition unit 20 and the reference image acquired from the reference image update unit 301 are supplied, and the unit 302 extracts each of the image features to supply it to the malfunction determination unit 303. Subsequently, the feature extraction unit 302 will be described as the feature extraction processing of arbitrary images without distinguishing the input image and the reference image.

In the feature extraction unit 302, an entire feature extraction unit 3020 calculates the features of the entire image. A block feature extraction unit 3022 extracts the features in each block divided into arbitrary blocks by a block division unit 3021. The block division unit 3021 will be first described, and each feature extraction processing will be then described.

Figure 6:
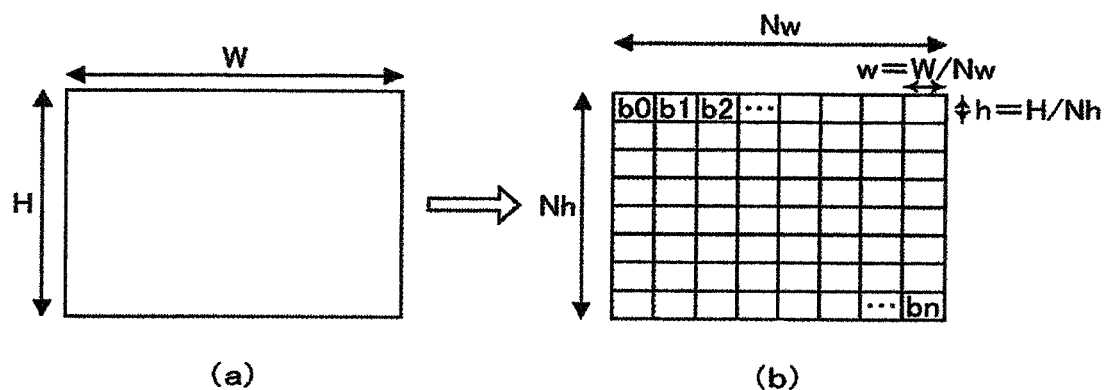
FIG. 6 illustrates a block division of the present invention.

The block division unit 3021 will be described with reference to FIG. 6. FIG. 6A illustrates the input image (or the reference image), and it is image data with a width of W and a height of H. The block division unit 3021 divides the above-described input image into the arbitrary number of blocks. FIG. 6B illustrates the block division. When the input image is divided into Nw in the horizontal direction and Nh in the vertical direction, the size of one block is equal to w (=W/Nw)×h (=H/Nh), and the whole number of blocks is equal to N=Nw×Nh. Here, each block is set to bn (N=0, 1, ..., N).

The number of block divisions relates to the sensitivity of the recognition processing. When the camera malfunction is desired to be detected in more detail, the number of block divisions may be fragmented. On the contrary, when the sensitivity is desired to be set to be low because of many disturbances, the number of block divisions is reduced, thereby acquiring detection results according to an application environment becomes possible.

Next, the image features of the entire feature extraction unit 3020 and the block feature extraction unit 3022 will be described without distinguishing the entire image and processing in each block for ease of explanation.

The features to be extracted according to the present embodiment will be described roughly dividing the features of the image into the image features and the statistic features. The image features represent information obtained as image data such as a luminance image, a differential image, and a color image of an RGB color space and an HSV color space. The luminance image is an image including only a luminance component of the input image. The differential image is an image in which contour information of the image is enhanced by an edge enhancement filter such as a Sobel filter, and information on the edge strength and the edge direction is obtained. Also, an image acquired by encoding a gradient of the intensity of luminance in adjacent pixels into 0 or 1 is one of the differential image, such as an increment sign code image. An RGB image or HSV image is one expressive form of color image, and the color space can also be selected to be a YCbCr image and an HLS image according to the environment.

The statistical feature is a statistical quantity in an arbitrary space within an image, and examples of the statistic character quantity include an average, a median, a distribution value, a maximum, and a minimum. As the statistical feature, a statistical quantity of the entire image is used in the above-described entire feature extraction unit 3020, and a statistical quantity in each block is used in the block feature extraction unit 3022.

Also, the correlation feature in which a similarity of these features is calculated is a type of the features; however, in the present invention, the correlation features is not calculated in the feature extraction unit 302, and can be used as a type of variation calculated in the malfunction determination unit 303. Examples include the correlation feature in which calculated is a similarity or dissimilarity of the image feature and the statistic feature, such as a normalized correlation, a summation of squared differences, a summation of absolute differences, a histogram intersection, and a histogram distance. Note that the subtraction can also be used as a variation to be calculated in the malfunction determination unit 303.

Further, these features may be used in combination thereof according to the execution environment. For example, a distribution value of the edge strength in the edge image, an R average of the RGB image, and a similarity due to the color distance can be arbitrarily selected and combined.

The entire feature extraction unit 3020 and the block feature extraction unit 3022 calculate the above-described features. The entire feature extraction unit 3020 calculates the features for the entire image, and the block feature extraction unit 3022 calculates each of the features in each block. Setting of the features is different depending on the camera malfunction desired to be detected, and can be performed by a user. The above will be described later.

Next, the malfunction determination unit 303 and the malfunction classification unit 304 illustrated in FIG. 2 will be described. The malfunction determination unit 303 determines the camera malfunction by using moving information within the video obtained by the above-described moving area detection unit 300, and the features obtained by the feature extraction unit 302.

Figure 7A:
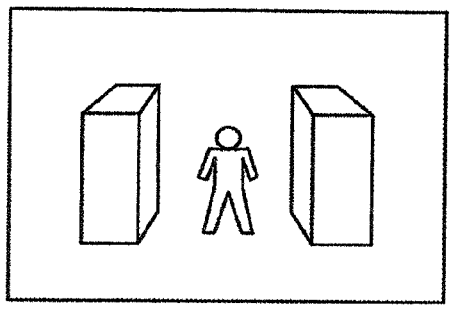
FIGS. 7A to 7H illustrate examples of camera malfunction recognized in the present invention.
Figure 7B:
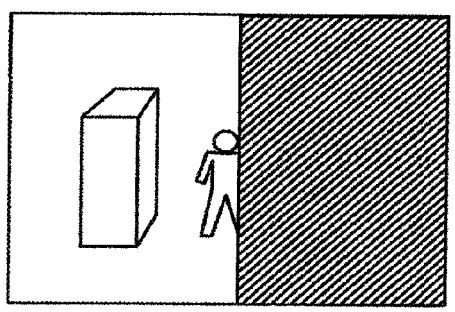
Figure 7C:
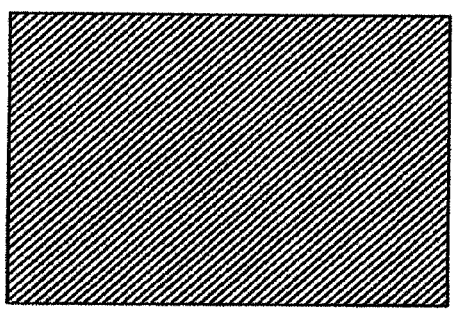
Figure 7D:
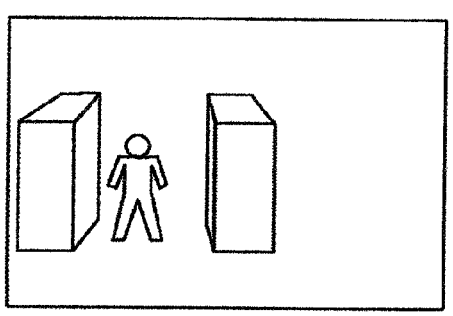
Figure 7E:
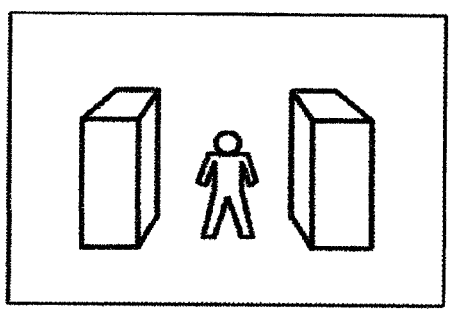
Figure 7F:
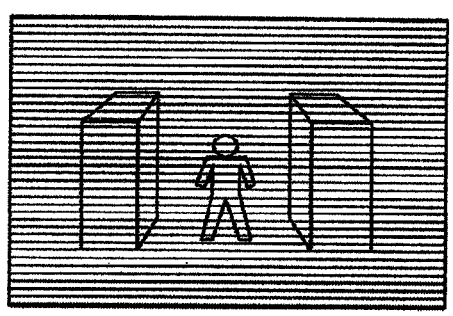
Figure 7G:
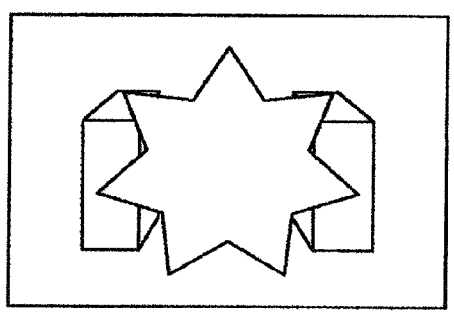
Figure 7H:
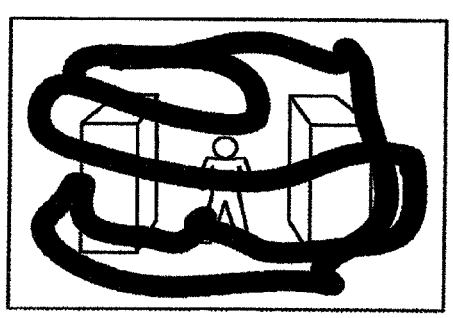

Here, the camera malfunction will be first described with reference to FIGS. 7A to 7H. FIGS. 7A to 7H illustrate examples of the types of the camera malfunction, and FIG. 7A illustrates a normal video. FIG. 7B illustrates an example in which occlusion to a camera lens is partially caused by objects such as a tape or fabric. FIG. 7C illustrates an example in which occlusion occurs over the entire camera. When the occlusion occurs, visibility is different depending on a gap between the occlusion object and the camera lens. When the object contacts with the camera lens, the video becomes dark, and it tends to become bright in proportion to the gap between the object and the camera lens. Further, when a pattern is present on the shielding, it may also be taken. Further, when the shielding has transparency, a background is taken to be transparent; this case is also defined as one of the occlusion in the present embodiment. FIG. 7D illustrates an example of a camera angle shift in which a change in the camera direction is caused with respect to the position of FIG. 7A. In the present invention, the camera angle shift is defined as a meaning including a deviation of visual field range due to the movement of a camera optical axis or the rotation and zoom of the camera. FIG. 7E illustrates an example in which a camera focus is not adjusted to the object and defocus occurs. Due to the defocus, the contour of the object becomes bleary. Further, the contour may become bleary by a homogeneous change in which moisture or dust adheres to the lens surface, and this case is also defined as the defocus in the present embodiment. FIG. 7F illustrates an example in which noises are added to a video. The noises are caused also by defects of the camera lens or image sensor, breaking of cable wires, or the influence of peripheral devices. Disturbance may be generated on the video due to defects of cable wires, and this case is also defined as noises in the present embodiment. FIG. 7G illustrates an example in which illumination or reflected light is incident on the video and halation occurs. When light is incident on the lens, a part or the entire of the video is degraded in overexposure conditions. FIG. 7H illustrates an example in which dirt is generated in a part of the camera lens. When the camera lens is coated by a spray, the dirt thereof is partially or wholly approximated to the occlusion of FIGS. 7B and 7C. The above-described camera malfunction is one example, and the visibility is different depending on the method of obstruction to the camera. Further, the above-described definitions can also be changed by a user. This can be realized by changing the malfunction determination criteria which will be described later.

The malfunction determination unit 303 will be described below. The malfunction determination unit 303 can be roughly divided into a step of calculating a feature change of an image and a step of integrating information on a malfunction candidate area and that on the previously-mentioned moving area and calculating a malfunction area. The malfunction determination unit 303 will be sequentially described.

Figure 8:
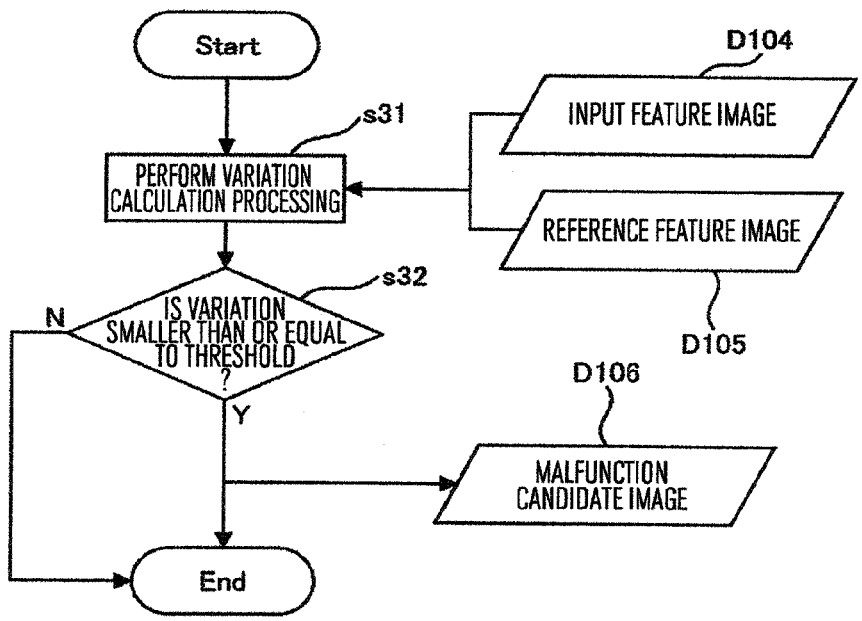
FIG. 8 is a flowchart illustrating a process procedure of a malfunction determination using the entire features of the present invention.

First, a step of calculating the feature change will be described by using as an example a procedure of detecting a camera angle shift with reference to FIG. 8. For the detection of the camera angle shift, the malfunction determination unit 303 uses the features of the entire image. The unit 303 calculates a variation between the input feature image D104 and the reference feature image D105 previously acquired by the feature extraction unit 302 (a step s31). Note that the input feature image D104 includes the entire features extracted by the entire feature extraction unit 3020 with respect to the input image D103 produced from the image acquisition unit 20. Further, note that the reference feature image D105 includes the entire features extracted by the entire feature extraction unit 3020 with respect to the reference image D100 produced from the reference image update unit 301. In the features of the entire image, the correlation value between the entire features (the input feature image D104) of the input image and the features (the reference feature image D105) of the reference image is reduced due to a change in the camera angle shift. In the present embodiment, a luminance image is selected as the feature, and the input feature image D104 and the reference feature image D105 are set to the increment sign code image. The increment sign code image is an image resulting from encoding the gradient of intensity between adjacent pixels of the luminance image to 0 or 1. In the step s31, as the variation, the unit 303 calculates the correlation value between the input feature image D104 and the reference feature image D105. In the correlation value between the increment sign code images, a method for representing the concordance rate of a sign in each pixel position as a real number from 0 to 1 is used.

Next, in a step s32, the malfunction determination unit 303 determines whether the variation calculated in the step s31 is smaller than or equal to the threshold. Here, it is known that, when the input feature image D104 is completely matched with the reference feature image D105, the variation (in this case, the correlation value) calculated in the step s31 is equal to "1", whereas when the input feature image D104 is uncorrelated with the reference feature image D105, the variation is equal to "0.5". Accordingly, the unit 303 sets a value from 0.5 to 1 as the threshold in this case. When determining that the variation is smaller than or equal to the threshold, namely, the camera angle changes (Y in the step s32), the unit 303 stores other values except "0" in its information area with respect to all pixels or all blocks of the malfunction candidate image D106. In the malfunction candidate image D106, the unit 303 changes a substitute value previously set according to the detected malfunction. For example, when the storage area of 8 bits is present in each pixel and block, the unit 303 may switch over ON/OFF of allocated bit according to the malfunction classification to each bit of "00000001" in the case of the camera angle shift and "00000010" in the case of the occlusion. Here, since the camera angle shift is detected, the least significant bit of the malfunction candidate image D106 is set to "1". In the step s31, the unit 303 may use a value acquired by subtracting the correlation value from 1 as the variation, and determine that the camera angle shift changes when the variation is larger than or equal to the threshold in the step s32. In the present embodiment, although the unit 303 calculated the change in the camera angle shift based on the change (correlation value) in the increment sign code image, the unit 303 can also select the features in the malfunction type in combination with the above-described various features and multiple features. Further, the unit 303 may calculate the correlation value or the subtraction as the variation according to the type of the malfunction desired to be detected or the features to be used.

Figure 9:
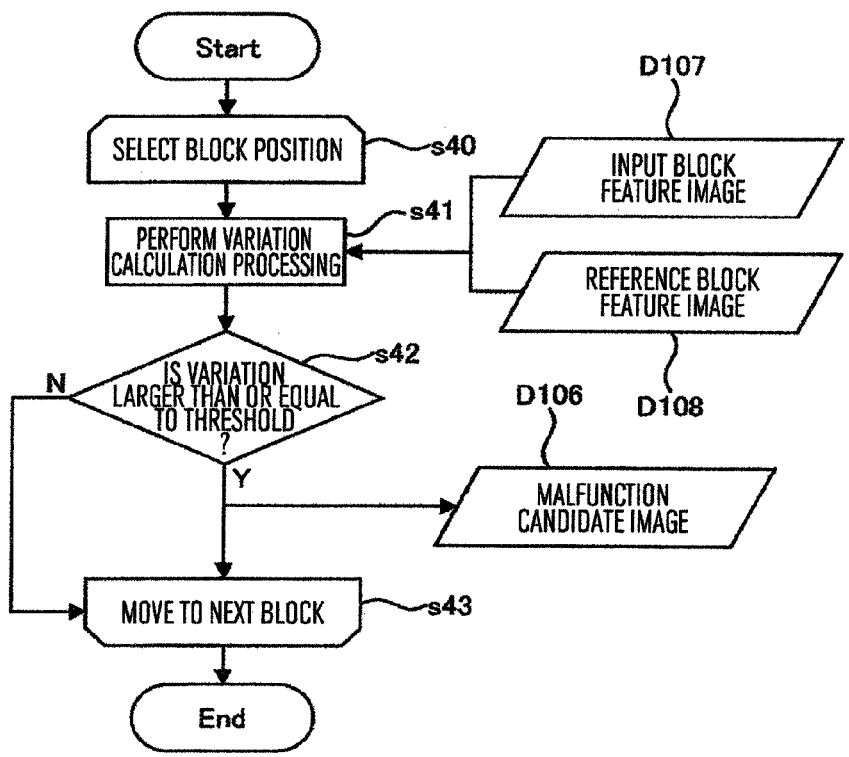
FIG. 9 is a flowchart illustrating a process procedure of a malfunction determination using features for each block of the present invention.

Next, a method for using the feature in each block will be described by using as an example a procedure of detecting the occlusion with reference to FIG. 9. A change that a lens is partially covered may occur in the occlusion, and therefore, the partial change needs to be determined. For this purpose, the malfunction determination unit 303 first selects a block position (a step s40), and calculates changes in an input block feature image D107 and a reference block feature image D108 in each block (a step s41). Here, the input block feature image D107 includes the block features extracted by the block feature extraction unit 3022 with respect to each image into which the block division unit 3021 divided the input image D103 produced from the image acquisition unit 20. On the other hand, the reference block feature image D108 includes the block features extracted by the block feature extraction unit 3022 with respect to each image into which the block division unit 3021 divided the reference image D100 produced from the reference image update unit 301. Further, the unit 303 determines the threshold of variation calculated in the step s41 (a step s42), calculates the malfunction candidate image D106, and repeats the above in all the blocks (a step s43).

In the occlusion, a change in the luminance of the background image and the input image is caused by the occlusion, and the differential component of the image is reduced in the occluded portion. In the present embodiment, the above-described change is detected in each block. The block feature extraction unit 3022 calculates a luminance average A (bn) in each block bn, and also calculates the distribution value of the edge strength, and set to V (bn) in each block. That is, as the input block feature image D107 and the reference block feature image D108, the unit 3022 uses the luminance average and the distribution value of the edge strength. For ease of explanation, an arithmetic operation of an arbitrary block will be subsequently described.

Suppose that luminance averages of the input image and the background image are set to A and A', and distribution values of the edge strength are set to V and V', respectively. The malfunction determination unit 303 calculates their changes (in this case, the subtraction) by using $D\_A=|A-A'|$ and $D\_V=|V-V'|$ (the step s41), and determines whether D_A and D_V are larger than or equal to the threshold, respectively (the step s42). If D_A and D_V are larger than or equal to the threshold, the unit 303 substitutes other values except 0 to the relevant block of the malfunction candidate image D106 and outputs it. The unit 303 performs the above-described processes with respect to all the blocks (the step s43).

In the above-described calculation of the malfunction candidate, the features and the change calculation method of the entire image or each block may be selected in each event desired to be output as the malfunction, and the malfunction candidate image D106 may be calculated. The predetermined value is stored in each bit of the information area in each block of the malfunction candidate image D106. Also in the method for using the features in each block, the correlation value may be calculated or the subtraction may be calculated as the variation according to the type of the malfunction desired to be detected or the features to be used.

Figure 10:
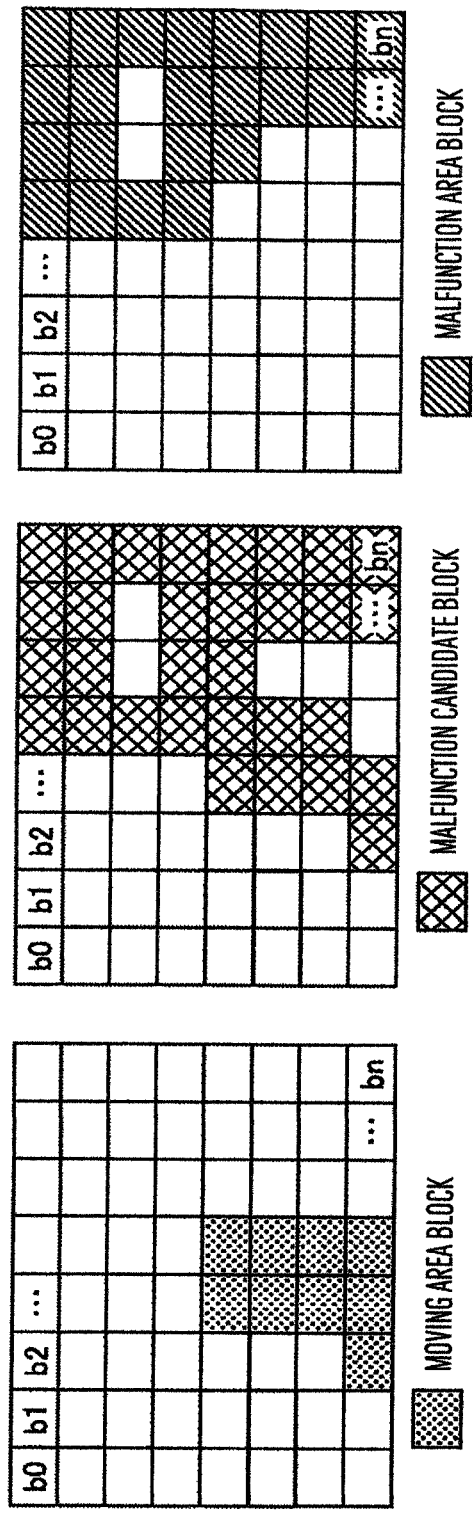
FIG. 10 is schematic diagrams illustrating a moving area block, a malfunction candidate block, and a malfunction area block of the present invention.

At a time point at which the feature of the entire image and that of each block are calculated so far, the moving area image D102 and the malfunction candidate image D106 are output. Note that the malfunction candidate image D106 is one example of information representing the type of the camera malfunction in each block. Next, the process of the malfunction determination unit 303 will be described by using the above-described images. In the malfunction determination unit 303, this corresponds to a step of integrating information on the malfunction candidate area and the moving area, and calculating the malfunction area. FIG. 10 illustrates a conceptual diagram according to the present embodiment. From the left side, FIG. 10 illustrates a moving area block, a malfunction candidate block, and a malfunction area block. The malfunction area block is calculated by using the moving area block and the malfunction candidate block.

Figure 11:
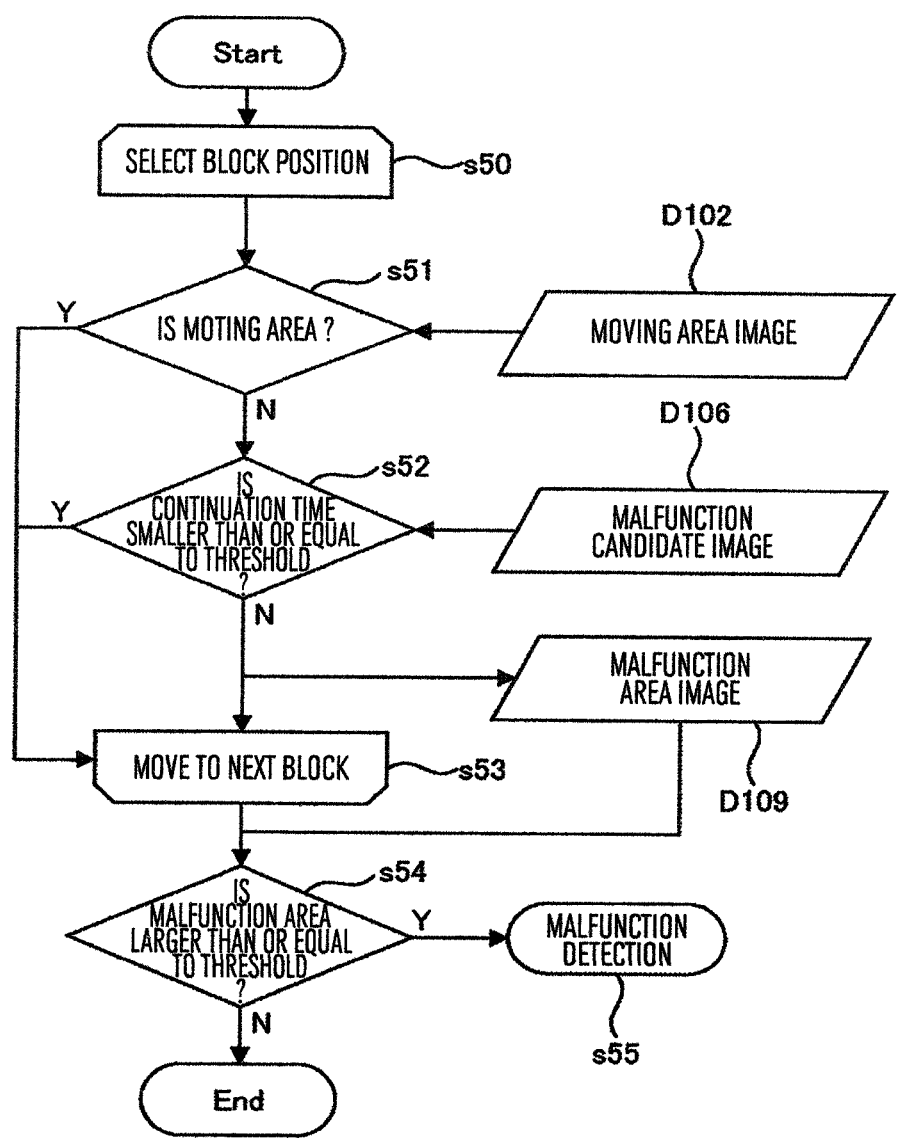
FIG. 11 is a flowchart illustrating a process procedure of a malfunction determination unit of the present invention.

Next, the flow from the malfunction determination up to the output will be described with reference to FIG. 11. Here, the malfunction determination unit 303 selects a block position (a step s50), performs a determination in each block, and repeats the above over the entire image (a step s53). By using the moving area image D102, the unit 303 first determines whether motion occurs within the block (a step s51). Here, the unit 303 determines that the motion occurs within the block, for example, in the case where the motion occurs in pixels the number of which is equal to or more than a predetermined threshold within the block. If the motion occurs (Y in the step s51), the unit 303 moves on to the next block (the step s53). If the motion does not occur (N in the step s51), the unit 303 then determines continuity of the malfunction by using the malfunction candidate image D106. In the above-described step, since the malfunction of the camera instantaneously occurs and fails to return to a normal condition in many cases, when the unit 303 determines the continuity of the malfunction, false reports are reduced as an object. If the continuity time of the malfunction is smaller than or equal to the threshold (or smaller than the threshold) (Y in a step s52), the unit 303 moves on to the next block (the step s53). At this moment, if the motion does not occur and the continuous time is larger than the threshold (or larger than or equal to the threshold) (N in the step s52), a malfunction is assumed to occur in the block. The unit 303 then substitutes the stored value of the malfunction candidate image D106 into the relevant block of the malfunction area image D109. In the processing so far, in the malfunction candidate image D106, the unit 303 stores other values except "0" in the block determined to be abnormal, and stores "0" in the block determined to be normal. Namely, the unit 303 detects the malfunction area as in the malfunction area block illustrated in FIG. 10.

Next, in the malfunction area image D109, the malfunction determination unit 303 calculates the number of blocks in which other values except "0" is stored. If the number of blocks is larger than or equal to the threshold, the unit 303 determines that the camera is abnormal (a step s54). When determining that the camera is abnormal, the unit 303 outputs it as a malfunction detection (a step s55). The determination in the step s54 is a determination related to the sensitivity of the camera malfunction. When this threshold is set to be larger, only malfunction which occurs in the entire screen is output. Therefore, the threshold can be arbitrarily set according to the use environment.

Figure 12:
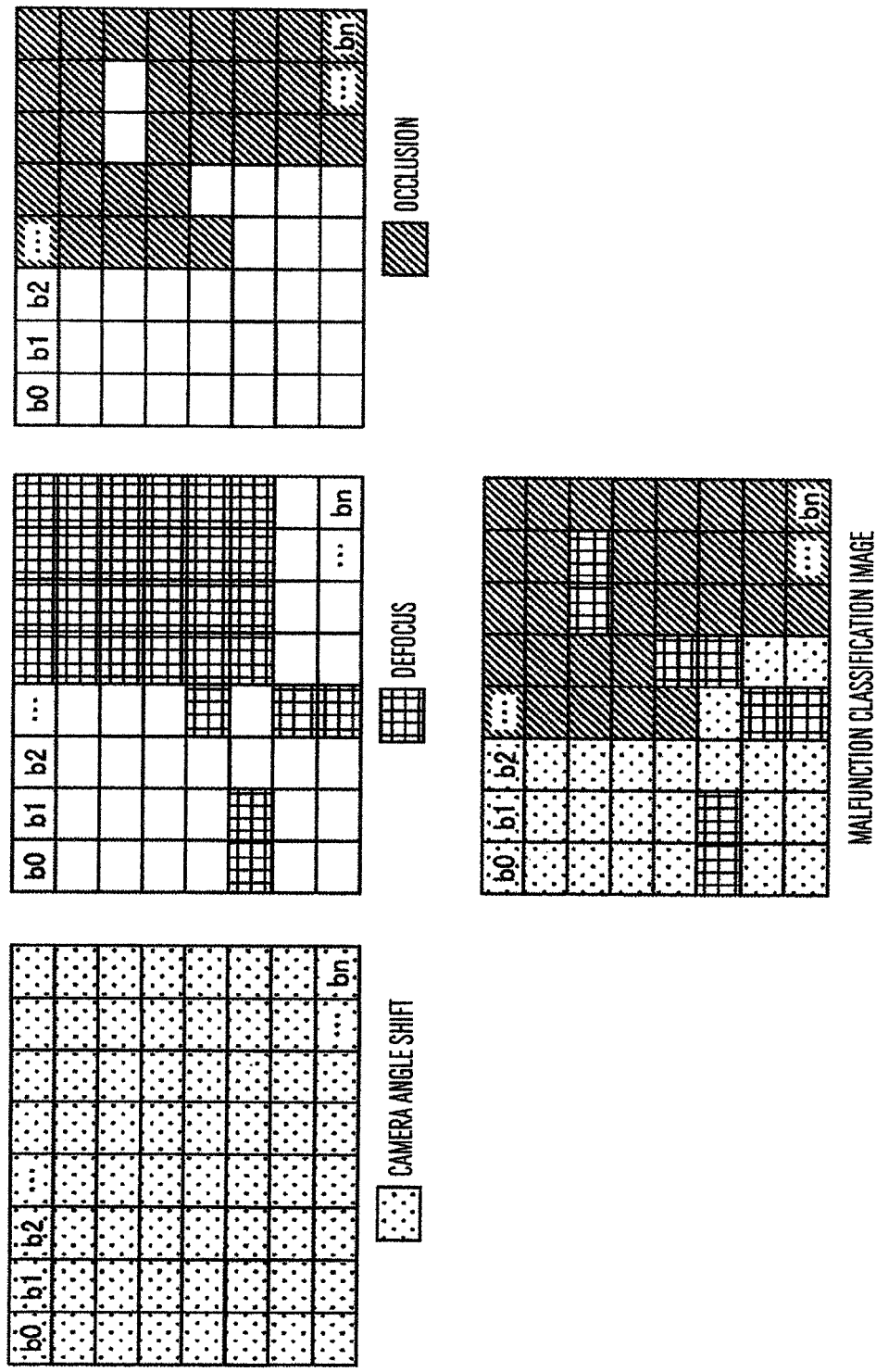
FIG. 12 illustrates a malfunction classification unit of the present invention.

Next, the malfunction classification unit 304 of FIG. 2 will be described. FIG. 12 illustrates the malfunction classification unit. FIG. 12 illustrates an output example by the type of the malfunction with regard to the malfunction area image D109 detected by the moving area detection unit 300 to the malfunction determination unit 303. This malfunction area image D109 also is one example of information illustrating the type of the camera malfunction in each block. Since the camera angle shift is a phenomenon which is generated over the entire image, the camera angle shift is generated in all the blocks. The defocus or occlusion may occur partially, and the portion determined to be partially abnormal is hatched. The malfunction classification unit 304 integrates the above-described information, and finally calculates the malfunction type. FIG. 13 illustrates one example of the malfunction classification criterion, and its determination criterion is set by a priority illustrated in FIG. 13. With regard to the partial occlusion, for example, the features to be used for determination are the block features, the features include the luminance average and the edge strength distribution, and the priority is set to 1. Further, with regard to the camera angle shift, the features to be used for determination are the entire features, the features include an increment sign code correlation, and the priority is set to 3. With regard to the defocus, the features to be used for determination are the block features, the features include the edge strength, the edge angle, and luminance average, and the priority is set to 2. When performing the process of FIG. 8 or 9, the threshold and information such as the threshold determination method (either the threshold or more, or the threshold or less) may be previously determined in each of the features to be used. In addition, at the time of performing the process of FIG. 8 or 9, when calculating the variation, information on whether the subtraction is calculated or the correlation value is calculated may be previously determined. In FIG. 13, when the "correlations" such as the "increment sign code correlation" and the "RGB correlation" are described, the increment sign code image and the RGB image is used as the features, and its correlation value is calculated as the variation. When the above-described "correlations" are not described, the subtraction is calculated, although not limited thereto. The increment sign code image and the RGB image may be described as the features, and information on whether the subtraction is calculated or the correlation value is calculated may be determined as the variation in each of the features. From the above-described information, when multiple malfunctions are output for each block, the unit 304 outputs blocks with a high priority based on the priority order. As a result, the unit 304 outputs a malfunction classification image illustrated in a lower stand of FIG. 12. In this malfunction classification image, the unit 304 sets the malfunction type of the maximum number of blocks to the camera malfunction, and outputs it to the output device 50 and the storage medium 60 via the output unit 40 of FIG. 2. When the malfunction type is stored in the storage medium 60 along with video data, the date and hour at which the camera malfunction occurred or its malfunction type can be confirmed and searched. The surveillance camera system according to the present embodiment has a search unit (not illustrated) capable of the above-described search.

In FIG. 13, a maintenance work is also set for each malfunction type. For example, when the malfunction type is determined to be the partial occlusion or the entire occlusion, the "shielding removal" is set. When the malfunction type is determined to be the camera angle shift, the "camera adjustment" is set to the maintenance work. The above-described setting can be arbitrarily performed based on the user environment.

Further, its factor can be set for each malfunction type. When the malfunction is detected, the present embodiment can be substituted so as to give notice of the factor.

Figure 14:
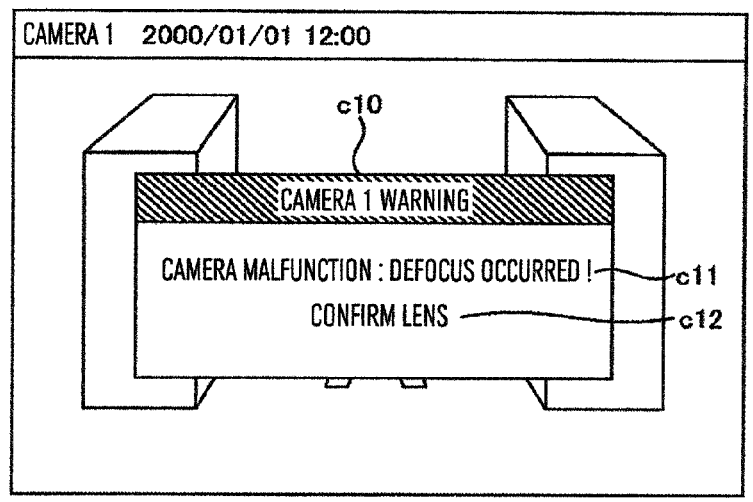
FIG. 14 illustrates an output example of the present invention.

FIG. 14 illustrates an example in which the camera malfunction and the maintenance work are output via the output unit 40 and the output device 50 of FIG. 1. In the user interface for confirming the surveillance camera or recorder video, which camera is abnormal is output to a window (c10), and the type of the camera malfunction is output (c11). By the setting of FIG. 13, the maintenance work can be output at the same time (c12).

Figure 15:
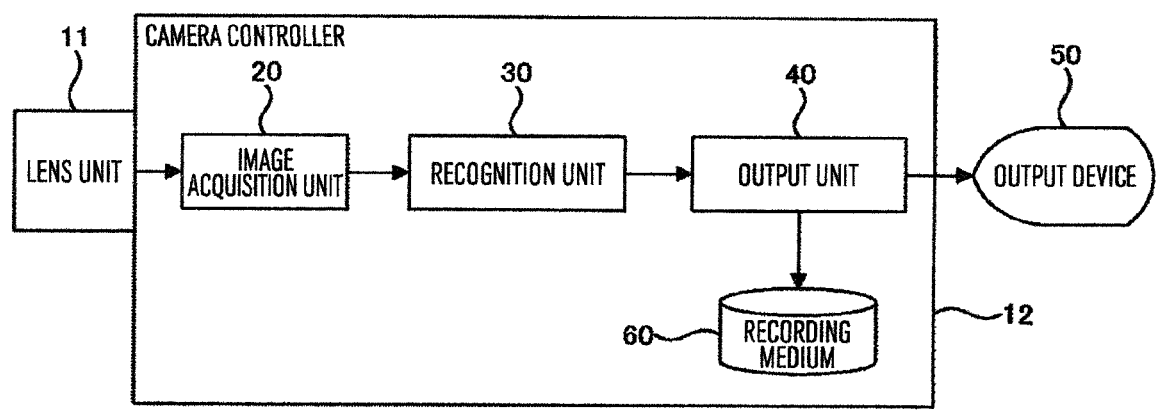
FIG. 15 illustrates an embodiment in the case where a camera of the present invention is incorporated.

In the present embodiment, as illustrated in FIG. 15, a mode may be adopted in which the surveillance camera system is integrated in equipment as in the camera configured by a lens unit 11 and a camera controller 12.

Figure 16:
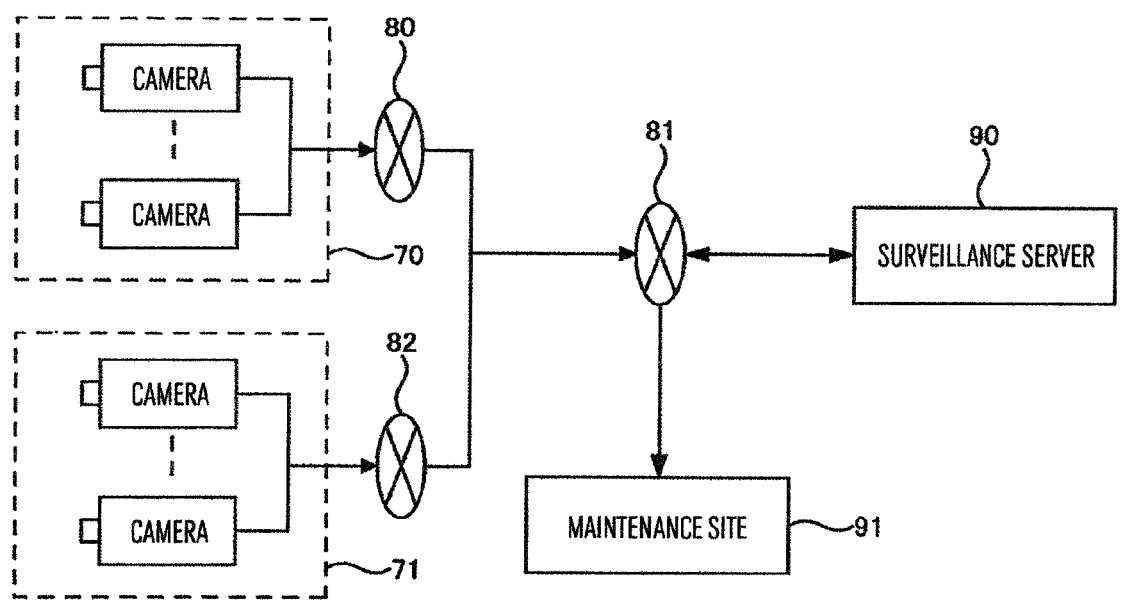
FIG. 16 illustrates an embodiment via a network of the present invention.

Further, as illustrated in FIG. 16, a mode may be adopted in which information such as a video is transferred to a surveillance server 90 and a maintenance site 91 via networks 80, 81, and 82 from surveillance sites 70 and 71 in an environment in which multiple cameras are installed. Further, a mode may be adopted in which an output (notification) of the camera malfunction is notified to the remote maintenance site 91 by using an arbitrary notification method.

According to the present invention, when using the features and moving area of the entire of the input image and the reference image and those divided into multiple blocks, the surveillance camera system can detect and classify various camera malfunctions such as partial occlusion, entire occlusion, camera angle shift (deviation in the camera direction), defocus, noises, and halation. Further, when giving notice of the type of malfunctions and the maintenance work in conjunction with the factor of the camera malfunction, the efficient surveillance camera system which supports a higher job efficiency of return from the malfunction, maintenance and check can be provided.

As described above, the present invention is described by using the present embodiment. The above-described configuration is merely one example, and the invention can be appropriately modified in various ways without departing from a technical idea. Further, respective configurations described in the present embodiment may be used in combination thereof unless contradictory to each other.

The invention claimed is:

1. A surveillance camera system having a camera malfunction detection function of detecting a camera malfunction using an input image and a reference image, comprising:
   a reference image update unit to generate or select the reference image to be compared;
   a block division unit to divide into blocks, each of the input image and the reference image;
   an entire feature extraction unit to extract each entire feature being features of an entire image, from the input image and the reference image;
   a block feature extraction unit to extract block features being features of each block from images after the block division of the input image and reference image by the block division unit, wherein each block has the block features which are a luminance average and a distribution value of edge strength;
   a malfunction determination unit to calculate a first variation between the entire features of the reference image and the entire features of the input image, and a second variation between the block features of a block of the reference image and block features of a corresponding block of the input image, to determine the camera malfunction by using a threshold, and to output information indicating a type of the camera malfunction of at least one of an entire image of the input image that was determined to be the camera malfunction or an image of each block that was determined to be the camera malfunction;
   a camera malfunction classification unit to refer to a predetermined malfunction classification criterion of the camera malfunction, to classify the camera malfunction based on the information indicating the type of the camera malfunction; and
   an output unit to output a camera malfunction classified by the camera malfunction classification unit.

2. The camera surveillance system according to claim 1, further comprising a moving area detection unit to detect a moving area with motion from the reference image within the input image based on the input image and the reference image, wherein the malfunction determination unit calculates a malfunction candidate area as a malfunction area when the malfunction candidate area is not the moving area and a malfunction continuation time continues for a predetermined time or more, and determines to be the camera malfunction when an area of the malfunction area is larger than or equal to a threshold.

3. The surveillance camera system according to claim 1, wherein the malfunction classification criterion has information on whether any one of the block features or the entire features is used for each type of the camera malfunction, the features used for determining the camera malfunction, and a priority for determining the camera malfunction.

4. The surveillance camera system according to claim 3,
wherein the malfunction determination unit detects the camera malfunction defined by the malfunction classification criterion in unit of blocks divided by the block division unit; and
wherein the camera malfunction classification unit classifies the camera malfunction based on the priority when a plurality of the multiple camera malfunctions are detected.

5. The surveillance camera system according to claim 1,
wherein the malfunction classification criterion has information on a maintenance work for returning from the camera malfunction or a factor of the camera malfunction, for each type of the camera malfunction.

6. The surveillance camera system according to claim 5,
wherein the output unit refers to the malfunction classification criterion, and outputs the maintenance work or the factor corresponding to the camera malfunction in addition to the camera malfunction.

7. The surveillance camera system according to claim 1,
wherein the output unit stores the camera malfunction and the input image in a storage medium.

8. A surveillance camera system according to claim 1, wherein the malfunction determination unit detects a camera occlusion when the second variation between a block feature of a block of the reference image and a block feature of a corresponding block of the input image, is larger than or equal to a threshold.

9. A surveillance camera system having a camera malfunction detection function of detecting a camera malfunction using an input image and a reference image, comprising:
a reference image update unit to generate or select the reference image to be compared;
a block division unit to divide into blocks, each of the input image and the reference image;
an entire feature extraction unit to extract each entire feature being features of an entire image, from the input image and the reference image;
a block feature extraction unit to extract block features being features of each block from images after the block division of the input image and reference image by the block division unit, wherein each block has the block features which are a luminance average and a distribution value of edge strength;
a malfunction determination unit to calculate a first variation between the entire features of the reference image and the entire features of the input image, and a second variation between the block features of a block of the reference image and block features of a corresponding block of the input image, to determine the camera malfunction by using a threshold, and to output information indicating a type of the camera malfunction of at least one of an entire image of the input image that was determined to be the camera malfunction or an image of each block that was determined to be the camera malfunction, wherein the malfunction determination unit is configured to calculate the second variation, for corresponding reference image and input image blocks, by determining $D\_A=|A-A'|$ and $D\_V=|V-V'|$, and determining whether $D\_A$ and $D\_V$ are larger than or equal to the threshold, where luminance averages of the input image and the reference image are set to $A$ and $A'$, respectively, and distribution values of the edge strength of the input image and the reference image are set to $V$ and $V'$, respectively;
a camera malfunction classification unit to refer to a predetermined malfunction classification criterion of the camera malfunction, to classify the camera malfunction based on the information indicating the type of the camera malfunction; and
an output unit to output a camera malfunction classified by the camera malfunction classification unit.

\* \* \* \* \*